United States Patent [19]

Flannery et al.

[11] Patent Number: 4,536,480

[45] Date of Patent: Aug. 20, 1985

[54] OPAL GLASSES HAVING AN APATITE OPACIFYING PHASE

[75] Inventors: James E. Flannery, Corning; John L. Stempin, Beaver Dams; Dale R. Wexell, Corning, all of N.Y.

[73] Assignee: Corning Glass Works, Corning, N.Y.

[21] Appl. No.: 592,929

[22] Filed: Mar. 23, 1984

[51] Int. Cl.$^3$ .......................... C03C 3/08; C03C 3/30
[52] U.S. Cl. ........................ 501/32; 501/59; 501/63; 501/67
[58] Field of Search ...................... 501/32, 59, 63, 67

[56] References Cited

U.S. PATENT DOCUMENTS 2,394,502  2/1946  Weyl et al. ............................ 501/59
4,298,390  11/1981  Flannery et al. ...................... 501/32
4,309,219  1/1982  Flannery et al. ...................... 501/32

FOREIGN PATENT DOCUMENTS 35525  5/1973  Australia .............................. 501/32
580027  8/1956  United Kingdom .................. 501/32
235256  1/1969  U.S.S.R. ............................... 501/32

*Primary Examiner*—Mark L. Bell
*Attorney, Agent, or Firm*—C. S. Janes, Jr.

[57] ABSTRACT

This invention is drawn to spontaneous opal glasses containing an apatite-type crystal opacifying phase and exhibiting a temperature interval between the emulsion and high temperature crystallization liquidi of at least 50° C. which consist essentially, in weight percent on the oxide basis, of

|  |  |  |  |
|---|---|---|---|
| | $Na_2O$ | 7.5–11 | $B_2O_3$ | 2–4.5 |
| | $K_2O$ | 0–5 | $SiO_2$ | 57–65 |
| $Na_2O + K_2O$ | $\leq 13$ | $P_2O_5$ | 2–5.5 |
| | BaO | 0–9.5 | F | 1.5–4 |
| | CaO | 0–3 | SrO | 0–5 |
| | ZnO | 0.4–5 | MgO | 0–2.5 |
| | $Al_2O_3$ | 8–13 | SrO + MgO | 0–5 |

CaO and/or SrO and/or BaO at least 2.5 mole %.

3 Claims, No Drawings

OPAL GLASSES HAVING AN APATITE OPACIFYING PHASE

BACKGROUND OF THE INVENTION

Our U.S. Pat. No. 4,298,390 discloses the production of spontaneous opal glasses wherein the opacity is the result of crystallinity in the glass and $Ba_2F(PO_4)$ constitutes the predominant crystal phase. Those glasses are asserted to exhibit softening points in excess of 710° C., a white opacity, excellent chemical durability, and to consist essentially, expressed in terms of weight percent on the oxide basis, of 6–10% $Na_2O$, 1–6%, $K_2O$, 4–11% BaO, 9–18% $Al_2O_3$, 1–5% $B_2O_3$, 50–70% $SiO_2$, 3.5–7% $P_2O_5$, 1–4% F, and optionally up to 3.5% CaO and/or up to 5% total of MgO and/or SrO.

It is explained that those glasses are characterized by a two-stage liquidus phenomenon; viz., a high temperature cloudiness or opacification which was termed an emulsion liquidus or liquid-liquid phase separtion, and the normal crystalline opal liquidus. Analysis of the phase separation indicated it to be rich in $Na_2O$, BaO, $P_2O_5$, and F. X-ray diffraction analyses of the crystalline opal phase identified the predominant crystal phase to be of a $Ba_2(OH)PO_4$ type. Nevertheless, it was assumed that fluoride substituted for OH in the crystal and, because X-ray analysis does not distinguish between fluoride and OH, the crystal phase was described as $Ba_2F(PO_4)$. Minor amounts of $NaBaPO_4$ and other unidentifiable species were also detected.

Culinary ware and tableware are thermally tempered to insure mechanical strength in service. Unfortunately, breakage of such ware prepared in accordance with U.S. Pat. No. 4,298,390 was not infrequently experienced during the thermal tempering procedure. Microscopic examination of the crystal phase showed that a substantial number of the crystals attained relatively large dimensions with inclusions of such crystals exhibiting diameters in excess of 0.001" (~25 microns) having been observed. Ware containing such large inclusions do not survive the thermal shock inherent in the air chill tempering process, viz., about 800° C. to room temperature.

A further and very extensive investigation of those glasses has determined that the crystallization mechanism is more complex than originally conjectured. This study demonstrated that, instead of a single crystallization liquidus, as discussed in the patent, there appears to be a first or high temperature crystallization liquidus and a second or low temperature crystallization liquidus. Hence, at the high temperature crystallization liquidus at least one species of apatite-type crystal [classical formula $Ca_{10}F_2(PO_4)_6$] precipitates out of the molten glass, and at the low temperature crystallization liquidus at least one other species of apatite-type crystal is generated. Much solid solution is possible in the apatite structure which manifests itself in very minor changes in the X-ray diffraction pattern; i.e., the overall pattern is relatively indistinguishable from the general appearance of classical apatite. Hence, as used herein, apatite includes such solid solution crystals.

It was noted in U.S. Pat. No. 4,298,390 that the emulsion liquidus and crystallization opal liquidus data were obtained utilizing a hot stage microscope composite apparatus. Such apparatus relies upon the sensitivity of the eye of the observer and, therefore, involves a significant measure of subjectivity in the reported determinations. Accordingly, to remove the element of subjectivity, the emulsion and low temperature crystallization liquidi were determined on a number of the working examples of the patent employing laser reflectance measurements, that technique being founded in conventional laser reflectance spectroscopy. Thus, those liquidi are readily gained from laser reflectance or back scattering/temperature curves. The high temperature crystallization liquidus cannot normally be directly obtained from such curves because that deflection is hidden in the steep slope brought about by the emulsion phenomenon. Consequently, the high temperature crystallization liquidus is read from the laser reflectance or back scattering/temperature curve in the derivative mode.

Table A records the emulsion, high temperature crystallization, and low temperature crystallization liquidi (in °C.) determined on several of the working examples provided in Table I of the patent. The Examples Nos. reflect those in Table I of the patent.

TABLE A

|  | 1 | 2 | 3 | 7 | 8 | 9 | 10 | 12 | 15 | 17 | 18 |
|---|---|---|---|---|---|---|---|---|---|---|---|
| Emulsion Liquidus | 1380 | 1400 | 1390 | 1380 | 1380 | 1370 | 1395 | 1380 | 1390 | 1400 | 1385 |
| High Temp. Liquidus | 1350 | 1365 | 1370 | 1350 | 1345 | 1345 | 1360 | 1350 | 1375 | 1370 | 1360 |
| Low Temp. Liquidus | 875 | 860 | 610 | 700 | 760 | 725 | 710 | 820 | 900 | 740 | 770 |

As can be observed, the interval between the emulsion liquidus and the high temperature crystallization liquidus is less than 50° C., often no more than 25° C. The above-mentioned extensive investigation of those glasses has indicated that, to prevent the formation of those large crystalline inclusions which can cause mechanical failure of ware, the temperature range between the emulsion liquidus and the high temperature crystallization liquidus must be expanded. That is the principal objective of the present invention.

SUMMARY OF THE INVENTION

We have found that the incorporation of about 0.4–5% by weight ZnO to compositions similar to those disclosed in U.S. Pat. No. 4,298,390 can substantially eliminate the above-described large inclusions, while retaining the chemical and physical properties of those glasses. The presence of ZnO significantly lowers the high temperature crystallization liquidus such that the interval between the high temperature crystallization and emulsion liquidi is expanded by at least 25° C. and, frequently, in excess of 50° C. Thus, the crystallization liquidus is frequently reduced to 1300° C. and below. The emulsion liquidus will generally remain essentially invariant with ZnO contents up to about 1%. At higher levels the emulsion liquidus will be depressed to some extent, but the reduction in the high temperature crystallization liquidus will generally track that decrease, such that the degree of expansion in the interval between the liquidi will be maintained. Hence, rather than an interval of less than about 50° C. and often no more than 25° C., the addition of ZnO opens the range to greater than 50° C., commonly at least 75° C., and sometimes in excess of 100° C. This increase in the spread of temperature between the high temperature crystallization and emulsion liquidi means that the exposure of the glass to a temperature between those liquidi can be carried out at temperatures sufficiently above the high temperature crystallization liquidus to minimize nucleation and the subsequent growth of large crystalline inclusions.

The glass compositions operable in the instant invention consist essentially, expressed in terms of weight percent on the oxide basis, of:

|  | | | | |
|---|---|---|---|---|
| | $Na_2O$ | 7.5–11 | $B_2O_3$ | 2–4.5 |
| | $K_2O$ | 0–5 | $SiO_2$ | 57–65 |
| $Na_2O + $ | $K_2O$ | $\leq 13$ | $P_2O_5$ | 2–5.5 |
| | BaO | 0–9.5 | F | 1.5–4 |
| | CaO | 0–3 | SrO | 0–5 |
| | ZnO | 0.4–5 | MgO | 0–2.5 |
| | $Al_2O_3$ | 8–13 | SrO + MgO | 0–5 |

CaO and/or SrO and/or BaO at least 2.5 mole % At least one member of the group CaO, SrO, and BaO must be present to yield an apatite-type opacifying phase selected from the group of $Ca_5F(PO_4)_3$, $Sr_5F(PO_4)_3$, $Ba_5F(PO_4)_3$, $(Ca_{5-x}Ba_x)F(PO_4)_3$ solid solution, $(Sr_{5-x}Ba_x)F(PO_4)_3$ solid solution, $(Ca_{5-x}Sr_x)F(PO_4)_3$ solid solution, $(Sr_{5-x}Ca_x)F(PO_4)_3$ solid solution, $(Ba_{5-x}Ca_x)F(PO_4)_3$ solid solution, and $(Ba_{5-x}Sr_x)F(PO_4)_3$ solid solution. All of those crystal species have the apatite-type structure with the general formula $R_5X(PO_4)_3$, wherein R is selected from the group of Ca, Sr, and Ba, and X is selected from the group of $F^-$ and $OH^-$. The minimum level required for each or a combination of two or more is expressed in terms of mole percent because of the obvious differences in the molecular weights of CaO, SrO, and BaO. To approximate in terms of weight percent, the minimum amounts of CaO, SrO, and BaO necessary to achieve dense opacity are about b 1%, 2%, and 3%, respectively.

Scanning electron microscopy and X-ray emission data indicate that zinc enters the separated phase to inhibit thereby the formation of the calcium and/or strontium and/or barius apatite crystals. Whereas the mechanism of that action has not been fully elucidated, two possible explanations have been proposed. First, it has been conjectured that the incorporation to some extent of zinc into the apatite structure yields a mixed apatite solid solution crystal which crystallizes at lower temperatures. Second, the presence of ZnO causes the development of a small amount of a crystal phase which inhibits the growth of apatite crystals.

The maximum effect which ZnO exhibits in preventing the formation of large crystalline inclusions, while at the same time insuring dense opacity, occurs in the range of 0.4–1%. Although ZnO additions up to 5% are viable, the resulting products do not demonstrate any substantial improvement in properties and the opacity may be adversely affected. When the level of ZnO exceeds 5%, the glasses are subject to poor opacity and take on a grayish tint in place of a white appearance.

Each of the remaining components of the base glass must be held within the above-defined limits. For example, when the content of CaO exceeds 3%, ZnO becomes ineffective in controlling the size of the crystalline inclusions because of the great insolubility of calcium apatite under these conditions. Above 5% SrO the glasses demonstrate very high emulsion liquidi. BaO contents in excess of 9.5% cause the coefficient of thermal expansion of the glass to become so high as to preclude adequate thermal tempering. At least 8% $Al_2O_3$ is necessary to insure good chemical durability, but contents in excess of 13% frequently result in decreased opacity. At $P_2O_5$ levels below 4%, opacity begins to deteriorate and below 2% the opacity becomes very poor. At values above 5.5%, ZnO cannot invariably control the growth of apatite inclusions because of the high emulsion temperatures and crystallization temperatures which result in those glasses. At least 1.5% F must be included to form the fluorapatite structure, but above 4% opacity decreases because the fluoride solubilizes the components of the apatite phase in the melt. The total $Na_2O + K_2O$ ought not to exceed about 13% because their fluxing action solubilizes the crystal components, leading to poor opacity.

ZnO in the specified amounts in the opal glass system of the instant invention will reduce the size of the crystalline inclusions, but may not invariably totally eliminate them at the higher levels of CaO, SrO, BaO, and $P_2O_5$. X-ray emission data also have indicated that ZnO contents in excess of 2% exhibit a tendency to prevent the inclusion of $P_2O_5$ in the emulsified phase. This situation is partially responsible for the loss of opacity as the amount of ZnO utilized is increased. Nevertheless, the alkaline earth metals, zinc, and fluoride are observed as other components of the customary apatite-forming phase.

In summary, ZnO in the apatite opal glass compositions of the present invention works in the following respects:

(a) it can essentially eliminate the undesirable large apatite inclusions; i.e., it lowers the temperature for the appearance of inclusions (high temperature crystallization liquidus); and (b) it can maintain or lower the emulsion liquidus while expanding the temperature interval between the high temperature crystallization and emulsion liquidi.

The inventive opal has a white appearance but it will be recognized that, if desired, conventional glass coloring transition metal oxides and/or rare earth metal oxides may be incorporated into the compositions in the usual proportions.

Related Application

Ser. No. 592,960, filed concurrently by us under the same title as the instant application, discloses that the incorporation of PbO in compositions similar to those of U.S. Pat. No. 4,298,390 and similar to those of the instant application can eliminate the large crystalline inclusions in like manner to the action of ZnO.

Prior Art

U.S. Pat. No. 4,298,390 provides an extensive recital of United States patents having some relevance to spontaneous fluorophosphate opal glasses and three other United States patents were cited during the prosecution of the application maturing into that patent. Rather than repeating that recital, however, the test of that patent is specifically incorporated herein by reference. None of the patents reported therein is as pertinent to the present disclosure as U.S. Pat. No. 4,298,390, the instant invention being an improvement thereupon.

Two other references disclosing spontaneous opal glasses having compositions generally related to those of the present inventive glasses are U.S. Pat. No. 4,309,219 and Australian Pat. No. 35,525. However, both of those patents describe glasses wherein the opal phase is essentially non-crystalline; i.e., the opacity results from the presence of immiscible glass phases, that phenomenon frequently being termed a liquid-liquid phase separation. Consequently, neither patent has any reference to an apatite-type crystal phase.

DESCRIPTION OF PREFERRED EMBODIMENTS

Table I below reports exemplary glass compositions, expressed in terms of parts by weight on the oxide basis as calculated from the batch, illustrating the compositional parameters of the inventive glasses. Because the sum of the individual components totals or closely approaches 100, for all practical purposes the values tabulated may be deemed to reflect the compositions in terms of weight percent. Furthermore, since it is not known with which cation(s) the fluoride is combined, it is merely recorded as fluoride (F), in accordance with conventional glass analysis practice. In general, about 20–30% by weight of the fluoride will be lost through volatilization during melting of the batch. Where desired, an oxide of arsenic or a chloride salt may be included in the bath to perform its customary function as a fining agent.

The actual components may comprise any ingredients, either the oxides or other compounds, which, when melted together, will be converted into the desired oxide in the proper proportions. The fluoride will typically be added as a silicofluoride. Although the description below is based upon laboratory scale melting, it must be appreciated that the tabulated compositions would also be useful in large scale commercial melting units.

The batch ingredients were compounded, tumble mixed together to assist in obtaining a homogeneous melt, and charged into platinum crucibles. The crucibles were introduced into a furnace operating at about 1500° C. and the batches melted for about four hours. The melts were poured into steel molds to yield slabs having the dimensions of 3.5"×2.5"×0.25", and the glass slabs immediately transferred to an annealer operating at 500°–550° C., the slabs being cooled to room temperature at a rate of about 50° C./hour.

Table I also reports a visual appraisal of the density of the opacity (Opac.), the presence of inclusions (Incls.) in the slabs, as observed through microscopic examination, the identity of the crystal phase(s) present (Cryst.), as determined via X-ray diffraction data, and the softening point in °C. (S.P.) where measured.

TABLE I

| | 1 | 2 | 3 | 4 | 5 | 6 | 7 | 8 | 9 |
|---|---|---|---|---|---|---|---|---|---|
| $SiO_2$ | 60.2 | 62.5 | 64.0 | 61.9 | 60.2 | 64.2 | 57.8 | 61.6 | 59.7 |
| $Na_2O$ | 8.5 | 6.9 | 8.7 | 8.6 | 8.8 | 7.8 | 8.3 | 8.5 | 8.3 |
| $Al_2O_3$ | 13.2 | 13.4 | 13.4 | 13.3 | 13.5 | 14.4 | 12.8 | 13.0 | 12.8 |
| $P_2O_5$ | 4.1 | 4.2 | 4.2 | 4.2 | 4.3 | 4.5 | 4.1 | 2.4 | 4.6 |
| BaO | 6.6 | 6.9 | 6.9 | 3.4 | 6.9 | 4.8 | 6.6 | 6.7 | 6.4 |
| $K_2O$ | 3.4 | 3.5 | 1.7 | 3.5 | 3.5 | 1.5 | 1.6 | 1.6 | 3.4 |
| CaO | 1.6 | 1.5 | 1.6 | — | 1.6 | 3.7 | 1.6 | 1.6 | 1.9 |
| F | 2.2 | 2.6 | 2.6 | 2.6 | 2.6 | 2.7 | 2.5 | 4.1 | 2.7 |
| $B_2O_3$ | 2.5 | 2.6 | 2.6 | 2.6 | 2.6 | 3.3 | 2.4 | 2.4 | 2.3 |
| ZnO | — | 2.4 | 2.4 | 2.1 | 3.8 | 3.8 | 4.7 | 2.4 | 0.6 |
| SrO | — | — | — | 2.3 | — | — | — | — | — |
| Incls. | Yes | No | No | No | No | Yes | No | No | No |
| Opac. | Dense | Dense | Dense | Medium | Medium | Medium | Medium | Poor | Medium |
| Cryst. | Apatite | Apatite | Apatite + Barium Zinc Phosphate | Apatite | — | Apatite + Barium Zinc Phosphate | Apatite | — | Apatite |
| S.P. | 785 | 788 | — | — | — | 820 | 800 | — | 808 |

| | 10 | 11 | 12 | 13 | 14 | 15 | 16 | 17 | 18 |
|---|---|---|---|---|---|---|---|---|---|
| $SiO_2$ | 59.3 | 59.6 | 58.3 | 60.5 | 60.8 | 59.1 | 60.1 | 60.2 | 59.4 |
| $Na_2O$ | 8.4 | 8.5 | 8.3 | 8.7 | 10.9 | 7.9 | 8.4 | 8.9 | 8.3 |
| $Al_2O_3$ | 13.1 | 13.2 | 12.4 | 13.4 | 8.9 | 12.5 | 13.0 | 8.8 | 12.8 |
| $P_2O_5$ | 4.1 | 4.1 | 4.1 | 4.2 | 4.1 | 3.9 | 4.1 | 4.1 | 4.1 |
| BaO | 6.6 | 6.6 | 6.5 | 6.9 | 6.7 | 6.2 | 6.6 | 6.7 | 9.2 |
| $K_2O$ | 3.4 | 3.4 | 3.2 | 3.5 | 1.7 | 3.2 | — | 4.4 | — |
| CaO | 1.8 | 1.6 | 1.6 | 1.0 | 2.1 | 1.5 | 1.5 | 2.0 | 1.5 |
| F | 7.2 | 2.2 | 2.2 | 2.6 | 2.5 | 2.1 | 2.5 | 2.5 | 2.6 |
| $B_2O_3$ | 2.5 | 2.5 | 2.5 | 2.6 | 2.5 | 2.4 | 2.5 | 2.5 | 2.5 |
| ZnO | 0.9 | 0.6 | 2.1 | 3.7 | 2.4 | 3.3 | 3.8 | 2.4 | 2.3 |
| SrO | | | | | | | | | |
| Incls. | No | No | No | No | No | No | No | No | No |
| Opac. | Medium | Dense | Medium | Medium | Medium | Medium | Medium | Poor | Medium |
| Cryst. | Apatite | Apatite | Apatite | Apatite | — | — | Apatite + Zinc Barium Phosphate | Apatite | Apatite + Zinc Barium Phosphate |
| S.P. | 770 | 790 | — | 805 | — | 790 | — | — | 830 |

| | 19 | 20 | 21 | 22 | 23 | 24 | 25 | 26 |
|---|---|---|---|---|---|---|---|---|
| $SiO_2$ | 59.1 | 59.8 | 59.8 | 60.5 | 60.6 | 61.2 | 60.0 | 60.1 |
| $Na_2O$ | 8.9 | 8.3 | 8.4 | 8.9 | 8.4 | 8.6 | 8.4 | 8.8 |
| $Al_2O_3$ | 11.7 | 12.8 | 13.1 | 13.8 | 10.0 | 13.2 | 12.9 | 13.5 |
| $P_2O_5$ | 4.1 | 5.1 | 4.1 | 4.4 | 4.6 | 4.2 | 4.1 | 4.3 |
| BaO | 6.6 | 6.6 | 6.6 | 3.5 | 6.4 | — | 6.6 | 6.9 |
| $K_2O$ | 1.6 | 1.0 | 3.4 | 3.6 | 3.4 | 1.7 | 1.6 | 1.0 |
| CaO | 1.6 | 1.6 | 1.6 | 1.5 | 1.9 | 1.7 | 1.6 | 1.0 |
| F | 2.5 | 2.5 | 2.2 | 2.7 | 2.7 | 2.5 | 4.1 | 2.6 |
| $B_2O_3$ | 4.0 | 2.5 | 2.5 | 2.7 | 2.3 | 2.6 | 2.5 | 2.6 |
| ZnO | 2.3 | 2.3 | 0.5 | 5.0 | 2.4 | 2.4 | 2.3 | 4.9 |

TABLE I-continued

| | | | | | | | | |
|---|---|---|---|---|---|---|---|---|
| SrO | — | — | — | 2.4 | — | 4.6 | — | — |
| Incls. | No | No | No | No | No | No | No | No |
| Opac. | Medium | Dense | Dense | Medium | Dense | Dense | Dense | Medium |
| Cryst. | — | Apatite + Zinc Barium Phosphate | Apatite | Apatite | — | Apatite | Apatite | Apatite + Zinc Barium Phosphate |
| S.P. | 810 | 792 | 796 | — | 765 | 805 | 785 | 788 |

Table II records the emulsion liquidus, the high temperature crystallization liquidus, and the low temperature crystallization liquidus, each expressed in terms of °C., determined on a number of the exemplary compositions listed in Table I utilizing laser reflectance measurements, along with $\Delta T$, defined as the difference between the emulsion liquidus and the high temperature crystalline liquidus, and a visual appraisal of the density of the opacity demonstrated by each.

Table III recites those three liquidus values, $\Delta T$, and opacity appraisals for the same glasses as reported in Table II except that ZnO is absent from the compositions thereof. The batches for the glasses (designated with an A) were compounded, mixed, melted, poured into slabs, and the slabs annealed in like manner to the above-described laboratory procedure.

TABLE II

| Example | Emulsion Liquidus | High Temp. Liquidus | Low Temp. Liquidus | $\Delta T$ | Opacity |
|---|---|---|---|---|---|
| 2 | 1380 | 1310 | N.O.* | 70 | Dense |
| 3 | 1380 | 1300 | N.O.* | 80 | Dense |
| 4 | 1330 | 1230 | 670 | 100 | Medium |
| 7 | 1290 | 1225 | N.O.* | 65 | Medium |
| 10 | 1400 | 1325 | 720 | 75 | Medium |
| 11 | 1380 | 1315 | 700 | 65 | Dense |
| 13 | 1310 | 1230 | N.O.* | 80 | Medium |
| 16 | 1315 | 1210 | N.O.* | 105 | Medium |
| 20 | 1400 | 1320 | N.O.* | 80 | Dense |
| 21 | 1420 | 1330 | 740 | 90 | Dense |
| 23 | 1390 | 1320 | N.O.* | 70 | Dense |
| 24 | 1460 | 1400 | 860 | 50 | Dense |
| 25 | 1360 | 1310 | N.O.* | 50 | Dense |

*Not Observed

TABLE III

| Example | Emulsion Liquidus | High Temp. Liquidus | Low Temp. Liquidus | $\Delta T$ | Opacity |
|---|---|---|---|---|---|
| 2A | 1400 | 1375 | N.O.* | 25 | Dense |
| 3A | 1410 | 1380 | 880 | 30 | Dense |
| 4A | 1370 | 1340 | 730 | 30 | Dense |
| 7A | 1360 | 1350 | 800 | 10 | Dense |
| 10A | 1390 | 1350 | 760 | 40 | Medium-Dense |
| 11A | 1390 | 1360 | 720 | 30 | Medium-Dense |
| 13A | 1360 | 1330 | N.O.* | 30 | Dense |
| 16A | 1370 | 1325 | N.O.* | 45 | Dense |
| 20A | 1420 | 1380 | 900 | 40 | Very-Dense |
| 21A | 1420 | 1390 | 760 | 30 | Very-Dense |
| 23A | 1400 | 1370 | 880 | 40 | Very-Dense |
| 24A | 1450 | 1420 | 920 | 30 | Very-Dense |
| 25A | 1370 | 1355 | N.O.* | 25 | Very-Dense |

*Not Observed

A comparison of Tables II and III indicates that the inclusion of ZnO increases the value of $\Delta T$ by at least 25°–50° C. All of the glasses in Table III manifested visible inclusions of crystals, whereas those of Table II did not. It appears that increasing the value of $\Delta T$ may reduce the density of the opacity exhibited by the glass. The mechanism underlying that phenomenon is believed to reside in the fact that, with high values of $\Delta T$, the substantially reduced glass viscosity at the high temperature crystallization liquidus results in lower diffusion rates for ions in the glass, thereby leading to decreased crystal growth for opacity. Increased density of opacity, however, can normally be readily restored through minor modifications in glass composition within the specified ranges of components.

Example 1 and the glasses of Table III are exemplary of the glass compositions disclosed in U.S. Pat. No. 4,298,390. As can be observed, although opacity can be dense, large inclusions are present therein. Example 6 is illustrative of the effect resulting from an excess of CaO. Hence, at CaO values above 3%, ZnO cannot control the size of the inclusions because of the great insolubility of calcium apatite in these glasses. Example 8 demonstrates the adverse effect upon opacity which an excess of fluoride coupled with a ZnO content above 2% can have. Thus, at levels in excess of 2%, ZnO appears to prevent inclusion of $P_2O_5$ in the emulsified phase. Example 17 indicates the adverse effect upon opacity which an excess of alkali metal oxide in combination with greater than 2% ZnO can exert.

The most preferred composition is Example 11.

We claim:

1. A white spontaneous opal glass exhibiting a softening point of at least 710° C., excellent chemical durability, a temperature interval between the high temperature crystallization liquidus and the emulsion liquidus of at least 50° C., and containing as the predominant crystal phase at least one apatite-type crystal selected from the group of $Ca_5F(PO_4)_3$, $Sr_5F(PO_4)_3$, $Ba_5F(PO_4)_3$, $(Ca_{5-x}Ba_x)F(PO_4)_3$ solid solution, $(Sr_{5-x}Ba_x)F(PO_4)_3$ solid solution, $(Ca_{5-x}Sr_x)F(PO_4)_3$ solid solution, $(Sr_{5-x}Ca_x)F(PO_4)_3$ solid solution, $(Ba_{5-x}Ca_x)F(PO_4)_3$ solid solution, and $(Ba_{5-x}Sr_x)F(PO_4)_3$ solid solution, said glass consisting essentially, expressed in terms of weight percent on the oxide basis, of

| | | | |
|---|---|---|---|
| | $Na_2O$ | 7.5–11 | $B_2O_3$ | 2–4.5 |
| | $K_2O$ | 0–5 | $SiO_2$ | 57–65 |
| $Na_2O$ + | $K_2O$ | $\leq 13$ | $P_2O_5$ | 2–5.5 |
| | BaO | 0–9.5 | F | 1.5–4 |
| | CaO | 0–3 | SrO | 0–5 |
| | ZnO | 0.4–5 | MgO | 0–2.5 |
| | $Al_2O_3$ | 8–13 | SrO + MgO | 0–5 |

CaO and/or SrO and/or BaO at least 2.5 mole %.

2. A spontaneous opal glass according to claim 1 containing 0.4–1% ZnO.

3. A spontaneous opal glass according to claim 1 containing 3–9% BaO.

* * * * *